Patented Jan. 4, 1944

2,338,475

UNITED STATES PATENT OFFICE 2,338,475

PRODUCTION OF HYDROCARBONS

Gustav Wirth, Wilhelm Wenzel, Franz Sabel, and Hans Laudenklos, Leuna, Germany; vested in the Alien Property Custodian No Drawing. Application August 22, 1940, Serial No. 353,654. In Germany August 28, 1939

1 Claim. (Cl. 260—449.6)

The present invention relates to a process for the conversion of carbon monoxide and hydrogen into hydrocarbons containing more than one carbon atom in the molecule.

If in carrying out the said conversion, the surplus heat evolved is removed by indirect exchange with a cooling fluid contacting the walls of the reaction space, the general practice has hitherto been to work with comparatively thin catalyst layers and low space velocities of gases (units, by volume of synthesis gas, measured at 0° C. under atmospheric pressure, passed through per unit of catalyst space and per hour). The usual reaction vessels have a height between 2 and 5 meters, while the highest space velocity of gas employed in the conversion amounts to about 150. The ratio hitherto employed of the space velocity to the height of the catalyst layer, expressed in meters, ranged up to about 50, but was in most cases considerably below this value. Consequently, when operating in low vessels and with small throughputs the linear velocity of flow of the synthesis gas, too, is very slow.

We have now found that the said conversion may be carried out with very great advantage when operating with a high linear velocity of flow of the synthesis gas (with reference to its volume at 0° C. under atmospheric pressure and to the cross section of the reaction space supposed to be free from catalyst) amounting to more than about 0.2 meter per second, preferably to more than 0.3 meter and most advantageously to more than 0.6 meter per second, and preferably selecting at the same time the height of the catalyst layer and the throughput so that the ratio of the space velocity to the height of the catalyst layer (expressed in meters) is not greater than about 100. It has been found that an increase of the throughput as well as the use of higher catalyst layers result in a substantial improvement of the efficiency of the catalyst and in a prolongation of its working life. Moreover, under these conditions, a benzine is obtained which is more stable to knocking.

The process may be carried out in reaction vessels of the usual height, i. e., those being up to 5 meters high, into which the gas is introduced with a linear velocity of more than 0.2 meter per second, advantageously of more than 0.2 meter per second, and passed through the reaction vessel at such a speed that the ratio of the throughput to the height of the catalyst layer in the reaction vessel is below 100. The process may be carried out in a series of successive stages as described in the copending application Ser. No. 330,730 of April 20, 1940, with a maximum yield of the desired products in each stage, in which case the same total yield and the conversion of an equal proportion of carbon monoxide and hydrogen contained in the fresh gas is obtained in a smaller total catalyst space than when working in the hitherto usual manner.

The particular efficiency of the catalysts obtained with the said high linear velocities of flow of the synthesis gas while simultaneously maintaining a ratio of the space velocity to the height of the catalyst layer in the reaction vessel amounting to more than 50 may easily be attained, for example with the tubes disclosed in the copending application Ser. No. 341,154. The reaction vessels employed for carrying out the process according to the present invention may be in a vertical or horizontal or any desired inclined position. The gas may flow through the catalyst layer in any desired direction. "Height of the catalyst layer" means extension of this layer in the direction of the flow of the synthesis gas.

In many cases it is advantageous to arrange the catalyst in the form of several layers and to pass the gases from one layer to the other. It is possible in this manner to establish a sufficiently long duration of sojourn of the gases in the catalyst space in spite of the high linear velocities of flow even in reaction vessels having no great height. These comparatively low reaction vessels, moreover, have the advantage that they may be charged with the catalyst and again emptied therefrom considerably more readily than higher ones.

The different catalyst layers of one conversion stage may be arranged one above the other or more preferably side by side. The total length of all catalyst layers arranged in series in one stage preferably amounts to from 2 to 20 meters, but may also be greater.

The process described may be carried out in plants wherein the synthesis is carried out in one or more stages; in the latter case all or only some of the stages are operated according to the present invention. For example, the gases may be passed through the first stage or stages at a high linear velocity of flow, while their velocity is smaller in the successive stages. It is preferable to use high reaction vessels or two or more shorter reaction vessels arranged in series for the stages carried out according to the present invention.

The remaining conditions of operation are the same as those usually employed. The temperatures generally range between 150° and 350° C. The conversion may be effected at atmospheric or superatmospheric pressure; for example pressures between 10 and 30 atmospheres or higher pressures, for instance 100 atmospheres and more, come into consideration. The pressures and the temperatures may be different in the various stages; for example, the first stage may be effected under atmospheric pressure while in the successive stages higher pressures are maintained. Any carbon dioxide formed in the prior fore further conversion. The process is not restricted to a definite construction of the reaction vessels. As catalysts, any substance known to have a catalytic activity in the conversion concerned may be used, but preferably those containing metals of the iron group are employed. They may be prepared by precipitation from solutions of salts of the said metals and subsequent reduction of the dried precipitate or by sintering iron powder or by melting iron in a current of oxygen and subsequently reducing the resulting ferrosoferric oxide or by some other method. In the several stages the same or different catalysts may be employed.

The synthesis gases may be prepared in the usual manner, especially by gasification of solid fuels, as for example coke, mineral coal, brown coal or less valuable fuels, or by conversion of natural gas or other gases containing methane with steam and/or carbon dioxide, or by subjecting such gases to incomplete combustion.

The catalyst may be arranged between plates through which a cooling medium flows or in tubes surrounded by a cooling medium; in any case, the synthesis chambers should be so constructed that the excess reaction heat may be removed sufficiently rapidly by a suitable cooling medium, for example by evaporating liquids.

When operating in tubular catalyst spaces the tubes may have an internal diameter of up to 20 millimeters, preferably between 5 and 15 millimeters, while with reaction spaces positioned between cooled plates or with annular spaces the distance between the cooled surfaces may amount up to 15 millimeters, preferably between 4 and 12 millimeters.

The following examples will further illustrate how the present invention may be carried out in practice, but the invention is not restricted to these examples.

*Example 1*

Tubes having an internal diameter of 15 millimeters which are arranged in a chamber 5 meters in height are charged with a catalyst consisting of 46 per cent of cobalt, 8 per cent of thorium oxide and 46 per cent of kieselguhr. When passing therethrough, at a temperature of 195° C. and under ordinary pressure, synthesis gas with a linear velocity of flow of 0.56 meter per second and with a space velocity of 400 (with reference to the space free from catalyst), that is a ratio of space velocity to height of the catalyst layer equal to 80, the daily yield per each cubic meter of catalyst space amounts to 500 kilograms of solid, liquid and gaseous hydrocarbons having more than one carbon atom in the molecule.

However, when operating in a chamber which is 2 meters in height and wherein the same catalyst is arranged in tubes having an internal diameter of 15 millimeters and presenting the same total catalyst space as above, and when passing therethrough the same gas at a temperature of 185° C. and under atmospheric pressure with a space velocity of 100 thus maintaining a ratio of the space velocity to the converter height of 50 and a linear velocity of flow of 0.056 meter per second within the catalyst chamber, 200 kilograms of solid, liquid and gaseous hydrocarbons containing more than one carbon atom in the molecule are obtained per day and per cubic meter of catalyst space. In both cases the yield of liquid hydrocarbons calculated with reference to the portion of the initial gas having undergone conversion is the same. The synthesis gas employed consists of 85 parts of carbon monoxide and hydrogen and 15 parts of inert gases.

*Example 2*

When passing a synthesis gas consisting of 85 per cent of carbon monoxide and hydrogen and 15 per cent of inert constituents at 190° C. and under ordinary pressure through a total quantity of 1 cubic meter of a catalyst consisting of 46 per cent of cobalt, 8 per cent of thorium oxide and 46 per cent of kieselguhr which is divided up into 4 layers, 2 meters in height each, arranged in series, with a throughput of 400 cubic meters hourly, i e. with a linear velocity of flow of 0.89 meter per second, 600 kilograms of solid, liquid and gaseous hydrocarbons containing more than one carbon atom in the molecule are obtained per day.

When passing the same amount of gas under the same conditions of temperature and pressure over a like volume of the same catalyst, which is arranged in a single catalyst layer 2 meters in height, with a linear velocity of flow of 0.22 meter per second, the daily output of solid, liquid and gaseous hydrocarbons containing more than one carbon atom in the molecule amounts to only 450 kilograms. In both cases the reaction is carried out in chambers comprising tubes containing the catalyst, the tubes having an internal diameter of 15 millimeters each. In both cases the yield of liquid hydrocarbons calculated with reference to the portion of the initial gas having undergone conversion is the same.

What we claim is:

A process for the catalytic conversion of carbon monoxide and hydrogen into hydrocarbons containing more than one carbon atom in the molecule in which the excess of the reaction heat is removed by indirect heat exchange with a cooling medium contacting the walls of the reaction space, which comprises passing the gas comprising carbon monoxide and hydrogen through the reaction space with a linear velocity of flow of at least about 0.6 meter per second and maintaining a ratio of the space velocity of the gas to the height of the catalyst layer (the latter expressed in meters) of not greater than about 100.

GUSTAV WIRTH.
WILHELM WENZEL.
FRANZ SABEL.
HANS LAUDENKLOS.